Jan. 9, 1968 W. H. CLEMENT 3,362,749
VEHICLE ARM REST
Filed Jan. 24, 1966

INVENTOR.
William H. Clement
BY
Dale A. Winnie
ATTORNEY

United States Patent Office 3,362,749
Patented Jan. 9, 1968

---

3,362,749
VEHICLE ARM REST
William H. Clement, Bloomfield Hills, Mich., assignor to Spartan Products, Inc., Madison Heights, Mich., a corporation of Michigan
Filed Jan. 24, 1966, Ser. No. 522,612
9 Claims. (Cl. 297—412)

This invention relates to support structures in general and more particularly to those suitable for use as vehicle arm rests and the like.

Vehicle arm rests and the overhanging part of instrument panels, for example, are frequently provided with a protective cover or padding to safeguard drivers and passengers against bodily injury in the event of an accident. As will be appreciated, anyone thrown against such members may suffer serious injury since the parts are normally made structurally strong, sound and non-yielding. Similar durability requirements also usually preclude the use of a sufficiently soft and pliable padding or cover material to really provide the protection needed.

In the case of arm rests used to close a vehicle door, they must be be more firm and serviceable and not too soft and spongy or they will fatigue and show wear too soon.

However, good resilience and elasticity is important in the support structure in order that it not fracture or fatigue too easily under shock loading and that it be able to regain its shape readily as required.

The present disclosure anticipates the problems mentioned and includes the desirable features suggested. It encompasses a new and unique support structure which is particularly well suited for use as a vehicle arm rest. It includes a member having a honeycomb construction which is embedded in polyurethane foam material that serves as a filler and padding. Over this is the conventional vinyl plastic or other outer covering material.

The honeycomb member is vertically oriented and includes or is secured to a backing member in a manner which enables it to have vertical strength for support or other purposes. At the same time, the honeycomb constuction enables the member to collapse laterally under load and still regain its original shape without permanent deformation afterwards.

These and other objects to be gained in the practice of this invention will be better understood and more fully appreciated upon a reading of the following specification having reference to the accompanying drawing and wherein.

Figure 1:
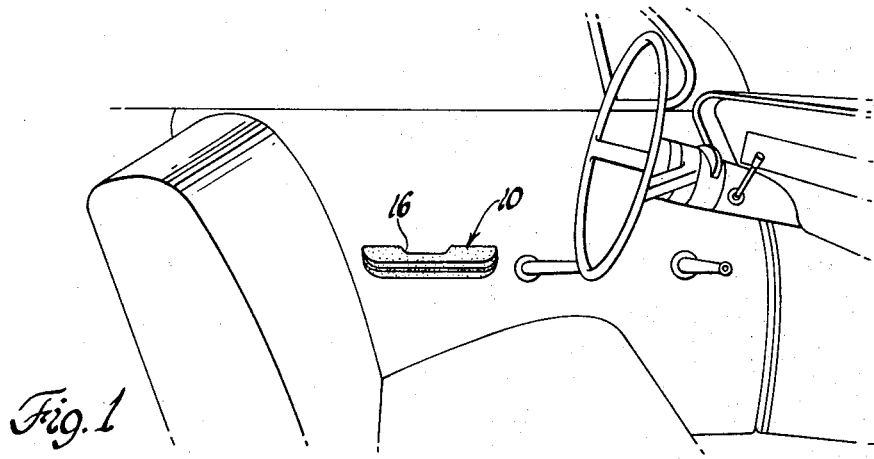
FIGURE 1 is a perspective view of the interior of an automobile showing a simple form of the new type arm rest as installed.
Figure 2:
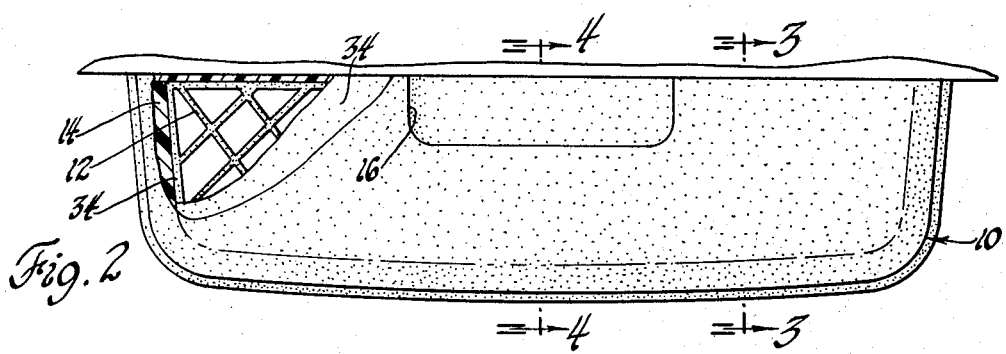
FIGURE 2 is a greatly enlarged top plan view of the arm rest shown in the first drawing figure.

Referring now to the drawing in more detail, the support structure of this invention in the form of a vehicle arm rest is shown in the first drawing figure as mounted on a vehicle door side wall of the driver's compartment for use as an elbow rest and, as will be appreciated, for use in closing the vehicle door.

The arm rest member includes an outer cover or casing 10 within which is provided a structural part 12 having a honeycomb structural form, as will subsequently be described in further detail. The honeycomb member 12 is encased within a reasonably firm but yielding sponge-like material which fills and occupies the space within the cover member 10 and about the honeycomb member 12 to give the arm rest its form and substance.

The cover member 10 is formed of vinyl or other like material to the shape of a vehicle arm rest by using a die mold formed of the shape and size required and by using any of the well known methods of form molding such as slush molding, rotational molding, vacuum forming or the like.

It is formed to include a hand-hold opening a recess 16 near the back side and includes smaller and less obvious recessed ways 18 on the underside thereof for fastener means 20 for use in securing the arm rest to a vertical support wall.

The back wall of the cover member 10 includes a slit opening 22 extending substantially the lenth thereof which enables the cover member, after it has been formed, to be opened and to receive therewithin the honeycomb support structure 12.

The honeycomb member 12, which provides the support structure of the arm rest, is formed to include a plate-like back wall part 24 which extends substantially the length thereof. It is formed, as will be noted, to accommodate the hand-hold opening 16 of the arm rest and to include vertical walls 26 extending forwardly thereof in the honeycomb pattern or configuration.

It will be appreciated that the walls of the honeycomb structure are disposed vertically and that the openings formed thereby extend clear through the member to provide an open-end cellular structure. This is to provide a member having greater strength and capable of providing more support in the vertical plane and which will yield more readily without permanent set or deformation, as will be described, under lateral pressure.

Figures 5, 6:
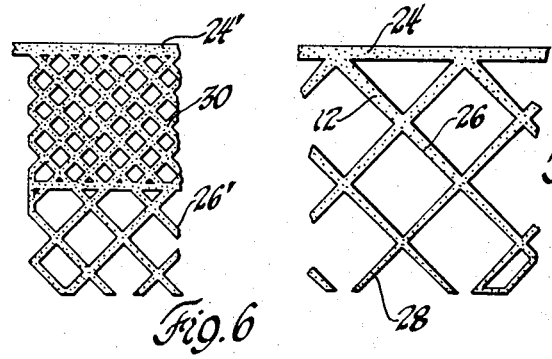
FIGURE 5 is a top plan view of the honeycomb member showing a preferred form of the structure having walls thicker towards the back and tapering towards the front thereof.
FIGURE 6 shows an alternate form of the honeycomb construction with a more dense configuration near the back wall.

The honeycomb structural member 12 may be made from different materials, but is preferably made of a polyethylene plastic material and formed to include walls which are thicker near the back wall 24 and are more tapering toward the front edge, as at 28 in FIGURE 5. With a thinner wall section near the forward outer edge of the arm rest member, it will be appreciated that it will give more readily than near the back wall where greater structural strength and support is needed. Also, this provides a greater resistance to lateral pressure in the course of collapse under shock loading.

FIGURE 6 shows a more dense honeycomb configuration 30 provided near the back wall member 24' as compared to a more open or less dense configuration spaced further out therefrom. This provides the same advantages as mentioned with respect to having tapering honeycomb walls. The larger openings near the front edge of the arm rest, as with thinner walls, afford less resistance to lateral pressure or shock loading.

The openings in the honeycomb member 12 are closed or covered by a sheeting material 34 or the like provided about the whole honeycomb structural member before it is inserted through the slit opening 22 and positioned in the arm rest cover 10. This is to be sure that the filler material 14 does not enter the openings since this would, in part, interfere with the lateral collapse of the arm rest which is desired.

The filler material 14 used to encase the honeycomb structural member 12 within the arm rest cover 10 is a polyurethane foam material. It is introduced in liquid form into the cover member 10, after the honeycomb structural member 12 is in place, through the slit opening 22 and pour hole openings 36, or the like, provided through the back wall part 24 of the honeycomb member. As is well known, the polyurethane material grows or expands to fill the inside of the cover part and is chemically changed and solidified into a sponge-like material. Just the right amount of material is used to fill all of the void space in the cover member and about the honeycomb support structure. Although not shown, provision is usually made for venting and overflow. Frequently the pour holes themselves serve this purpose.

In the present instance the polyurethane foam material provides a reasonably firm but yieldingly soft sponge-like padding material within the arm rest cover. It does not penetrate within the cells of the honeycomb because of the sheeting material 34, as previously mentioned. However, it otherwise fills all of the vacant space within the arm rest cover member.

Figures 3, 4:
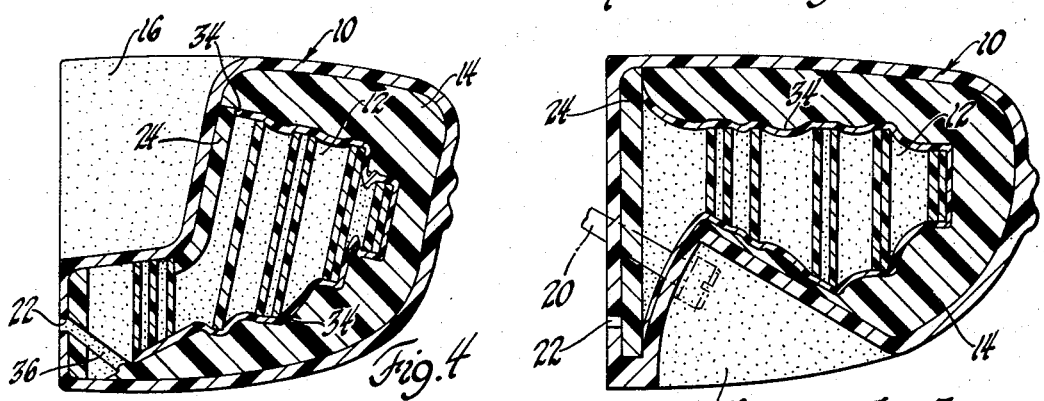
FIGURE 3 is a vertical section through the arm rest taken substantially along the line 3—3 of the previous drawing figure.
FIGURE 4 is a cross-sectional view through the hand-hold part of the arm rest taken substantially along the line 4—4 of the second drawing figure and showing the structure partially collapsed.

In use, as will be appreciated, the arm rest member is strong and firm enough to receive and support a member thereon. At the same time, under a lateral load or pressure it will yield, as best shown by FIGURE 4, and partially collapse without permanent set or deformation. The cellular honeycomb structure allows this collapse and the polyethylene plastic material of which the structure is made as well as the elastomeric sponge-like filler material assures that the member will regain its shape without fatigue or set.

Although a preferred form and embodiment of this invention has been shown and described in detail, it will be appreciated that certain modifications and improvements, beyond those suggested, are within the scope of the teachings set forth. Accordingly, such of these improvements and modifications as are within the spirit of the invention and are not specifically excluded by the language of the hereinafter appended claims, are to be considered as inclusive thereunder.

I claim:
1. A structure having load bearing strength and yielding resistance to lateral impact forces, comprising:
   a honeycomb member including vertically disposed intersecting and interconnected walls forming open cells therebetween and having end wall support strength in their combination,
   said cells being open at the upper and lower ends thereof, and allowing for the lateral collapse of said walls therewithin under lateral impact loads,
   and a cover means enclosing said honeycomb member therewithin and providing support and impact padding therearound.
2. The structure of claim 1,
   said honeycomb member having the walls thereof disposed diagonally relative to the side thereof receptive of impact loads.
3. The structure of claim 2,
   said honeycomb member being of semi-rigid polyethylene plastic material providing end wall support and allowing for the lateral collapse of said walls and their subsequent recovery.
4. The structure of claim 3,
   said walls being of tapering thickness from the back to the front side edges thereof for increasing resistance to impact loading near the back side of said member.
5. The structure of claim 3,
   said honeycomb member having cells with smaller openings near the back side thereof for increased resistance to impact loading near the back side thereof.
6. A vehicle arm rest, comprising;
   an outer cover member preformed to the shape of a vehicle arm rest,
   a core member of honeycomb construction received in said cover member and having vertically disposed and intersecting walls forming cells open therebetween and at their upper and lower ends for permitting the lateral collapse of said walls therewithin,
   an elastomeric filler material received in said cover member and about said core member for providing a padded arm rest support,
   and said core member walls having end wall strength in combination providing for firm arm rest support and yielding laterally under impact loads for the collapse thereof in collisions.
7. The vehicle arm rest of claim 6, including;
   means protecting said open cells against being filled with said elastomeric filler material and obstructing the collapse of said walls therewithin.
8. The vehicle arm rest of claim 7,
   said core member being of polyethylene plastic material allowing for the lateral collapse of said walls and their subsequent recovery.
9. The vehicle arm rest of claim 8,
   said core member walls being disposed diagonally relative to the outer disposed sides of said arm rest cover for being more easily collapsed within said open cells.

References Cited
UNITED STATES PATENTS

| | | | |
|---|---|---|---|
| 1,555,396 | 9/1925 | Bourgon | 297—412 X |
| 2,581,203 | 1/1952 | Rakas | 297—412 |
| 3,000,020 | 9/1961 | Lombard et al. | 5—355 |
| 3,099,021 | 7/1963 | Wetzler | 5—353 |
| 3,123,403 | 3/1964 | Hood | 297—412 |
| 3,161,436 | 12/1964 | Hood | 297—460 |
| 3,222,698 | 12/1965 | Levenson | 5—361 |

CASMIR A. NUNBERG, *Primary Examiner.*